US012504437B2

(12) United States Patent
Miyazaki et al.

(10) Patent No.: US 12,504,437 B2
(45) Date of Patent: Dec. 23, 2025

(54) AUTOMATIC ANALYSIS DEVICE

(71) Applicant: Hitachi High-Tech Corporation, Tokyo (JP)

(72) Inventors: Mariko Miyazaki, Tokyo (JP); Nobuhiro Tsukada, Tokyo (JP); Kazuhiro Noda, Tokyo (JP); Eiichiro Takada, Tokyo (JP); Yuka Miyake, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 267 days.

(21) Appl. No.: 17/775,409

(22) PCT Filed: Oct. 21, 2020

(86) PCT No.: PCT/JP2020/039517
§ 371 (c)(1),
(2) Date: May 9, 2022

(87) PCT Pub. No.: WO2021/111754
PCT Pub. Date: Jun. 10, 2021

(65) Prior Publication Data
US 2022/0397582 A1    Dec. 15, 2022

(30) Foreign Application Priority Data

Dec. 6, 2019  (JP) ................. 2019-221061

(51) Int. Cl.
*G01N 35/02* (2006.01)
*G01N 35/00* (2006.01)
*G01N 35/10* (2006.01)

(52) U.S. Cl.
CPC ... *G01N 35/02* (2013.01); *G01N 2035/00356* (2013.01); *G01N 2035/00534* (2013.01);
(Continued)

(58) Field of Classification Search
None
See application file for complete search history.

(56) References Cited

U.S. PATENT DOCUMENTS 4,586,546 A * 5/1986 Mezei ................ G01N 35/1011
141/2
11,262,371 B2   3/2022 Fukaya et al.
(Continued)

FOREIGN PATENT DOCUMENTS

JP    H58-196461 A   11/1983
JP    S63-066466 A   3/1988
(Continued)

OTHER PUBLICATIONS

International Search Report for PCT/JP2020/039517 dated Dec. 22, 2020. 3 pages.

*Primary Examiner* — P. Kathryn Wright
(74) *Attorney, Agent, or Firm* — Volpe Koenig

(57) ABSTRACT

An automatic analysis device improves the uniformity of a mixed liquid by noise agitation by a dispensing mechanism. The dispensing mechanism agitates a mixed liquid by suctioning the mixed liquid into a reaction vessel by a nozzle and then re-discharging the suctioned mixed liquid into the reaction vessel. When the mixed liquid is re-discharged into the reaction vessel, the nozzle is moved upward at a speed higher than a speed at which the liquid surface of the mixed liquid rises due to the re-discharging of the mixed liquid from the nozzle during a first period and lowers the speed of moving the nozzle upward than the speed during the first period while maintaining or reducing the speed at which the liquid surface of the mixed liquid rises due to re-discharging of the mixed liquid from the nozzle during a second period following the first period.

10 Claims, 8 Drawing Sheets

(52) U.S. Cl.
CPC .............. *G01N 2035/00544* (2013.01); *G01N 2035/1023* (2013.01); *G01N 2035/1058* (2013.01)

(56) References Cited

U.S. PATENT DOCUMENTS

| | | | | |
|---|---|---|---|---|
| 2009/0316519 | A1* | 12/2009 | Gorka | B01F 23/451 366/140 |
| 2011/0223061 | A1* | 9/2011 | Oonuma | G01N 35/1004 422/62 |
| 2018/0188141 | A1* | 7/2018 | Drews | G01N 35/1097 |
| 2021/0025911 | A1 | 1/2021 | Adachi et al. | |

FOREIGN PATENT DOCUMENTS

| | | | |
|---|---|---|---|
| JP | H05-215755 | A | 8/1993 |
| JP | H08-313536 | A | 11/1996 |
| JP | H11-304817 | A | 11/1999 |
| JP | 2006-184009 | A | 7/2006 |
| JP | 2007-132855 | A | 5/2007 |
| JP | 2010-271203 | A | 12/2010 |
| JP | 2015-132521 | A | 7/2015 |
| WO | 2018110145 | A1 | 6/2018 |
| WO | 2019181620 | A1 | 9/2019 |

\* cited by examiner

[FIG. 1]
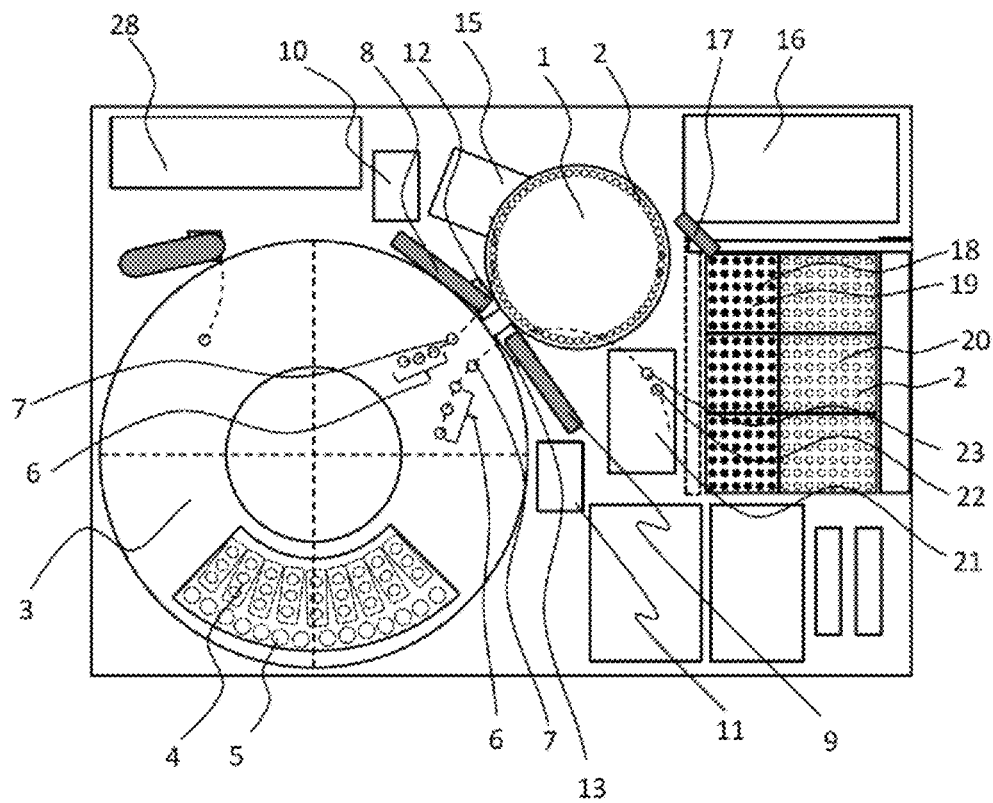
[FIG. 2]
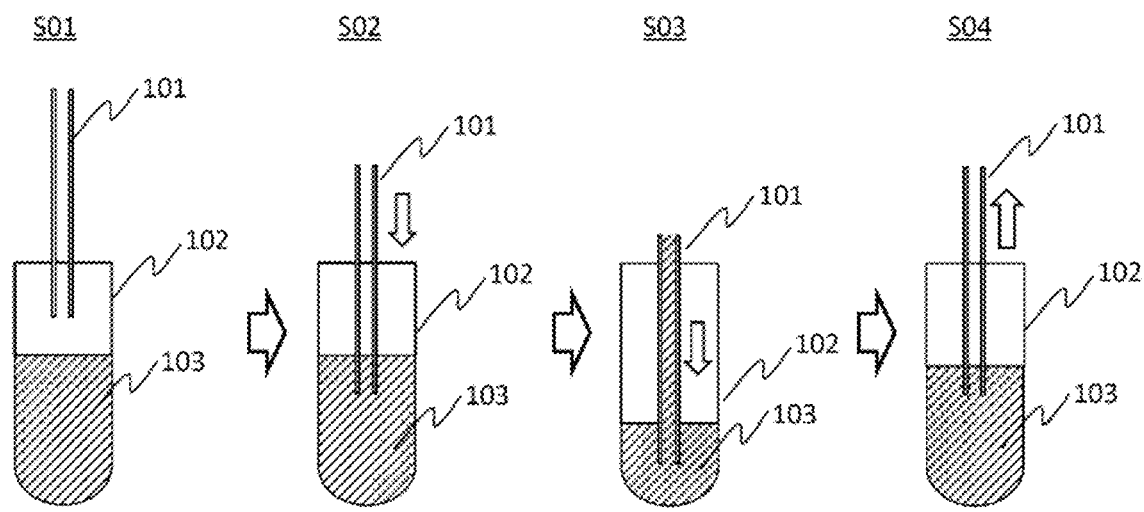

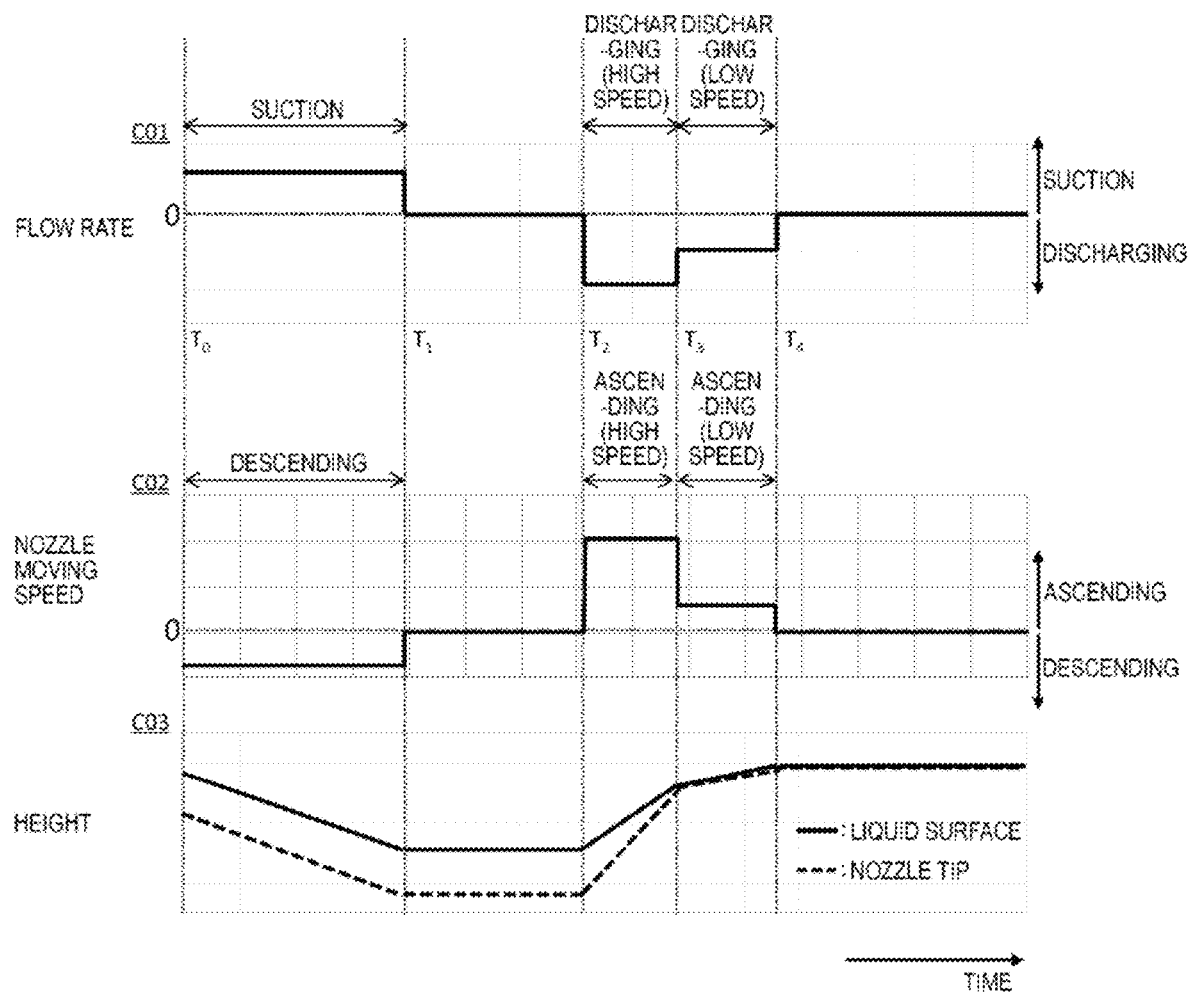

[FIG. 4]
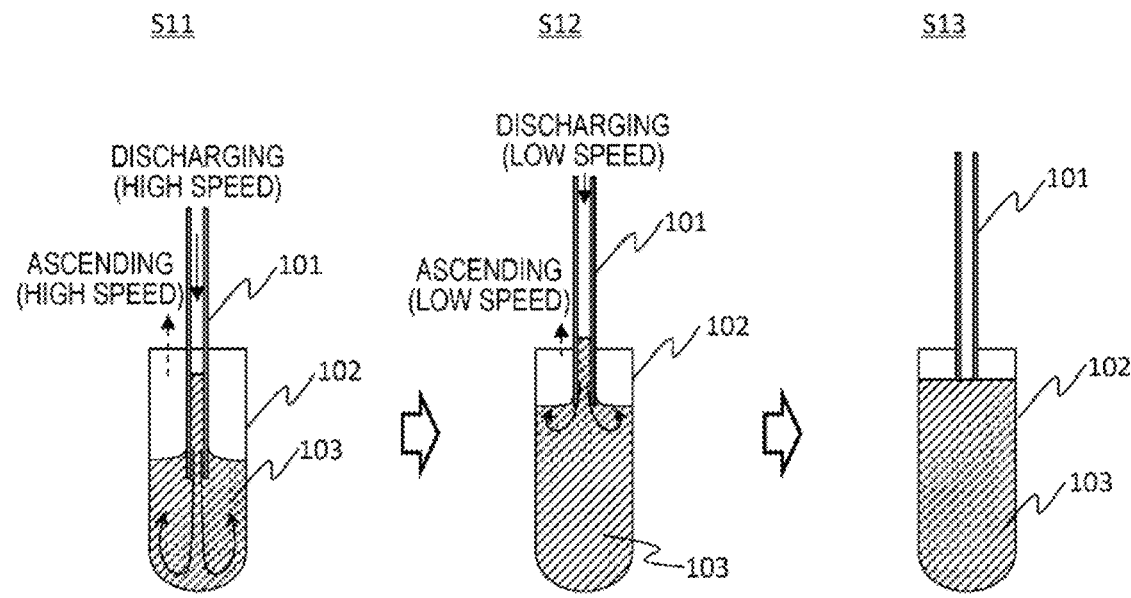

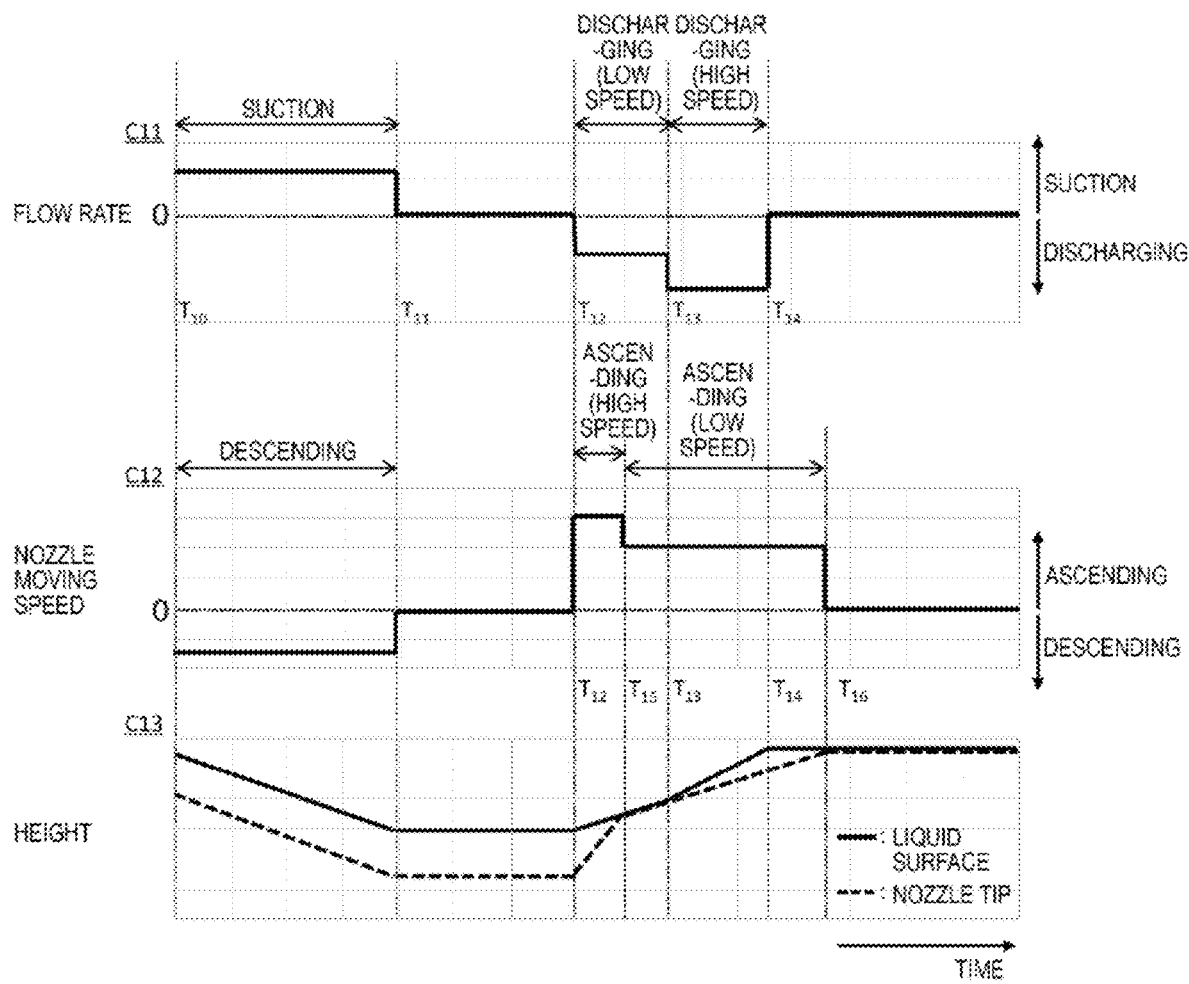
[FIG. 5]

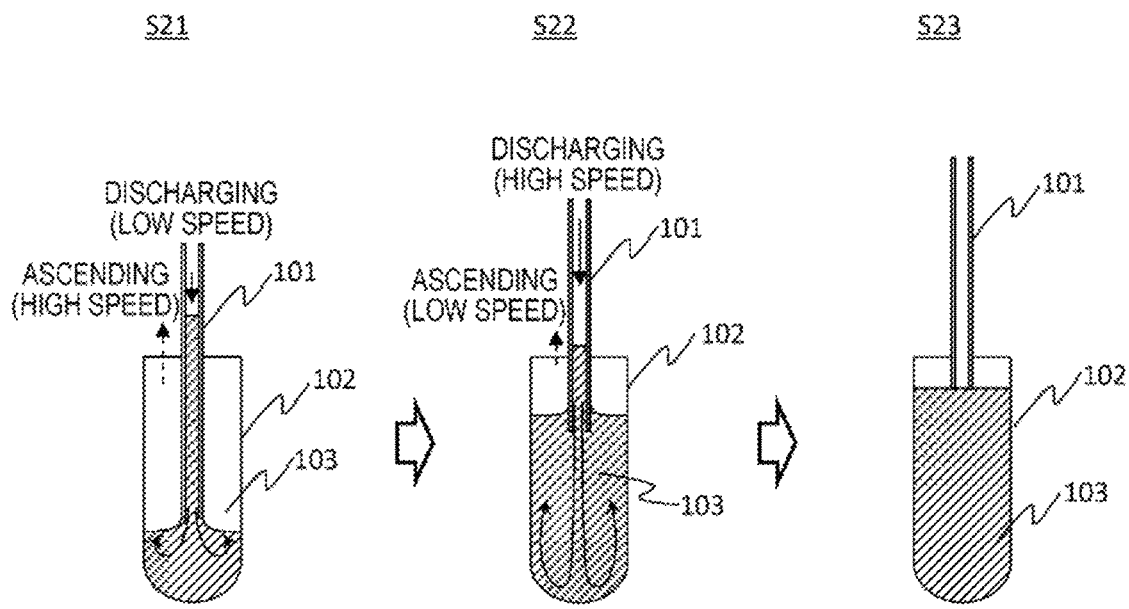

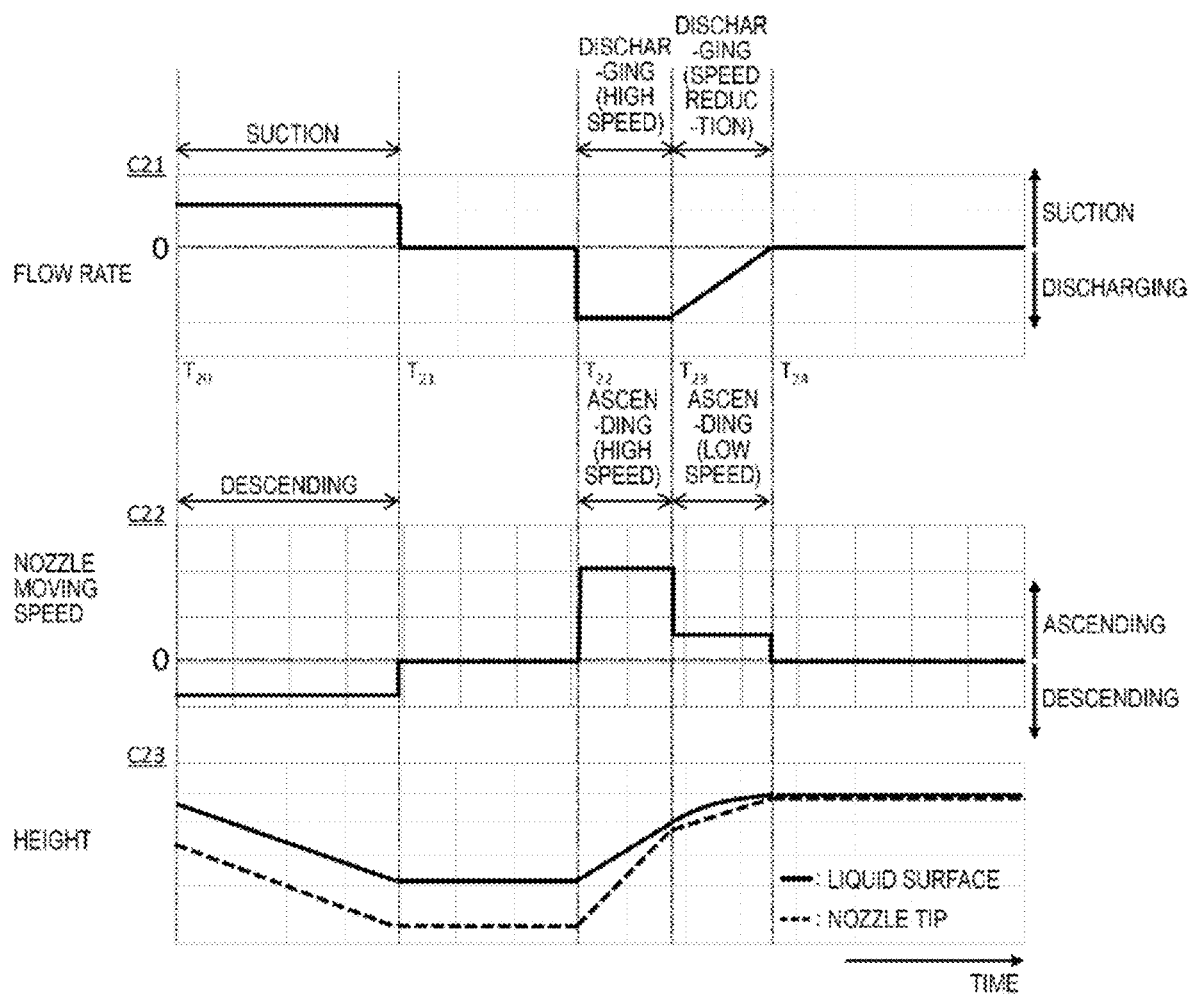

[FIG. 8]
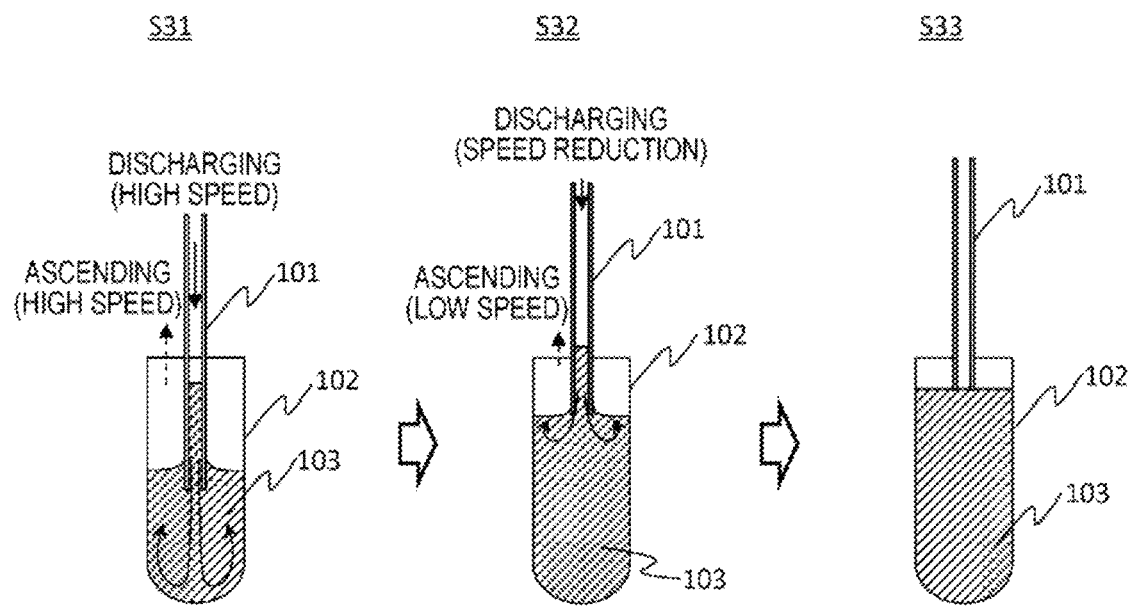
[FIG. 9]
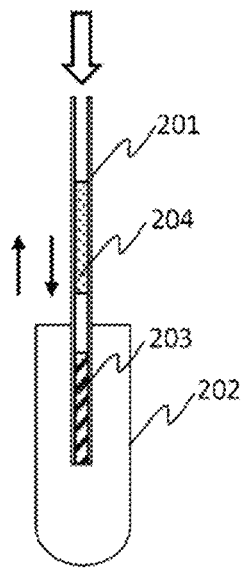

[FIG. 10A]
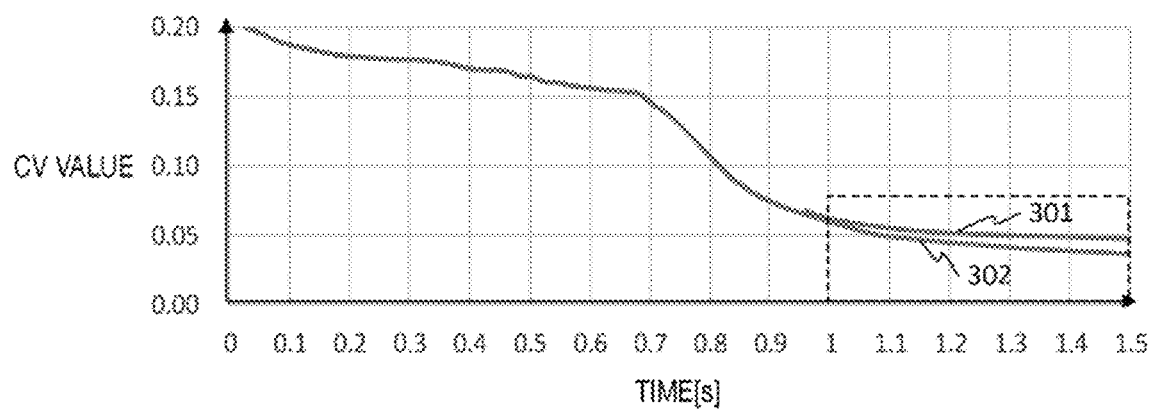
[FIG. 10B]
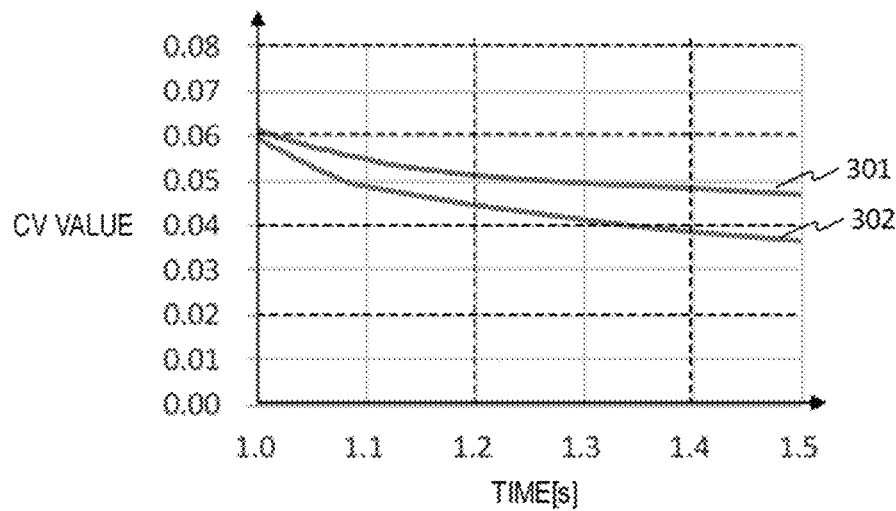

AUTOMATIC ANALYSIS DEVICE

TECHNICAL FIELD

The present invention relates to an automatic analysis device that executes qualitative and quantitative analysis of a specific component contained in a biological sample such as blood or urine.

BACKGROUND ART

As an automatic analysis device, a biochemical analysis device that analyzes a biological component contained in a specimen (sample) such as blood and urine, and an immunoassay analysis device are known. The automatic analysis device optically measures a concentration of a mixed liquid generated by a reaction between a sample and a mixed liquid used for analysis of each inspection item, activity of an enzyme, and the like.

In order to execute the measurement with high accuracy, it is necessary to agitate a sample and a reagent as uniformly as possible. As a method of agitating the sample and the reagent, there is a method of agitating the sample and the reagent using a dispensing mechanism without providing an agitating mechanism different from the dispensing mechanism for a purpose of saving a space of the device, shortening a cleaning step, and the like.

PTL 1 and PTL 2 disclose that at least a part of a mixed liquid in a reaction vessel (adjustment vessel) is suctioned into a dispensing nozzle and is then discharged into the reaction vessel (adjustment vessel) to agitate the mixed liquid (hereinafter, referred to as nozzle agitation).

CITATION LIST

Patent Literature

PTL 1: JP-A-S63-66466
PTL 2: JP-A-2015-132521

SUMMARY OF INVENTION

Technical Problem

PTL 1 does not disclose details of a suction operation and a discharge operation in the nozzle agitation. PTL 2 discloses the nozzle agitation by using a disposable nozzle, and discloses that in a nozzle agitation step, suction is executed at a position where a nozzle tip is brought into contact with or close to a bottom of the adjustment vessel, and at the time of discharge, the nozzle tip discharges a liquid near a liquid surface after the discharge. A speed at which the nozzle discharges the mixed liquid is variable in accordance with a surface tension or viscosity of the liquid.

In general, since the dispensing mechanism suctions the liquid, the nozzle is descended to immerse the nozzle tip in the liquid to be suctioned. At this time, a liquid amount varies depending on an object to be measured, and thus a height of the liquid surface varies. When a nozzle other than the disposable nozzle is used, it is necessary to clean the immersed nozzle tip in order to prevent contamination. Therefore, when immersing the nozzle in the liquid, liquid surface detection is executed, and the nozzle is immersed to a certain depth based on the detected liquid surface. An immersion depth of the nozzle tip is determined as a depth at which a detection variation is absorbed and a cleaning range is not increased too much. As a method of executing the liquid surface detection, there is a method of detecting the liquid surface by electrostatic capacity, ultrasonic wave, or the like.

Inventors of the invention have found that immersing a nozzle tip portion in a mixed liquid at the time of nozzle agitation hinders uniformity of the mixed liquid due to the nozzle agitation. The reason is that since the mixed liquid above the tip of the nozzle is not suctioned, agitation of the mixed liquid above the tip of the nozzle is difficult to proceed, a flow of a liquid to be agitated is difficult to be generated near a side surface of the nozzle at the time of re-discharging, and agitation near the side surface of the nozzle is difficult to proceed.

In addition, since there is a concern that an optical measurement may be adversely affected when bubbles remain in the mixed liquid, it is necessary to prevent entrainment of bubbles as much as possible during the re-discharging.

An object of the invention is to enhance the uniformity of the mixed liquid in the reaction vessel due to the nozzle agitation by vigorously agitating the mixed liquid near the liquid surface of the reaction vessel, in particular, at a depth at which the nozzle tip is immersed at the time of suction.

Solution to Problem

An automatic analysis device according to an aspect of the invention includes: an incubator in which a reaction vessel is arranged; a dispensing mechanism that includes a nozzle movable upward or downward and dispenses a sample or a reagent into the reaction vessel; and a control unit that controls the dispensing mechanism to agitate a mixed liquid of the sample and the reagent in the reaction vessel. The dispensing mechanism agitates the mixed liquid by suctioning the mixed liquid in the reaction vessel by the nozzle and then re-discharging the suctioned mixed liquid into the reaction vessel, and when re-discharging the mixed liquid into the reaction vessel, the control unit moves the nozzle upward at a speed higher than a speed at which a liquid surface of the mixed liquid rises due to the re-discharging of the mixed liquid from the nozzle, during a first period, and lowers the speed of moving the nozzle upward than the speed during the first period while maintaining or reducing the speed at which the liquid surface of the mixed liquid rises due to re-discharging of the mixed liquid from the nozzle, during a second period following the first period.

Advantageous Effect

An automatic analysis device is provided in which uniformity of a mixed liquid due to nozzle agitation by a dispensing mechanism is enhanced.

Other technical problems and novel characteristics will be apparent from a description of the present specification and the accompanying drawings.

BRIEF DESCRIPTION OF DRAWINGS

FIG. 1 is a schematic diagram of an automatic analysis device.

FIG. 2 is a diagram showing a procedure of nozzle agitation.

FIG. 3 is a diagram showing an example of drive control of nozzle agitation according to Embodiment 1.

FIG. 4 is a diagram schematically showing a state in which a mixed liquid is agitated in Embodiment 1.

FIG. 5 is a diagram showing an example of drive control of nozzle agitation according to Embodiment 2.

FIG. 6 is a diagram schematically showing a state in which a mixed liquid is agitated in Embodiment 2.

FIG. 7 is a diagram showing an example of drive control of nozzle agitation according to Embodiment 3.

FIG. 8 is a diagram schematically showing a state in which a mixed liquid is agitated in Embodiment 3.

FIG. 9 is a diagram showing an analysis model used for computational fluid analysis.

FIG. 10A is a diagram showing an analysis result.

FIG. 10B is a diagram showing an analysis result.

DESCRIPTION OF EMBODIMENTS

Hereinafter, embodiments of the invention will be described with reference to the drawings. In the drawings, common components and similar components are denoted by the same reference numerals, and redundant description will be omitted as appropriate.

FIG. 1 schematically shows an overall configuration of an automatic analysis device. In FIG. 1, reaction vessels 2 are arranged on a circumferential position of an incubator 1. The reaction vessels 2 are used common for all reactions, and the reaction vessels 2 are disposable. The reaction vessels 2 are stored in a reaction vessel tray 20, and are supplied to the incubator 1 by a dispensing tip/reaction vessel transport mechanism 17. The incubator 1 is controlled by a driving mechanism such as a motor so as to be rotationally driven by a distance corresponding to arrangement positions of a predetermined number of reaction vessels in one cycle.

A plurality of reagent bottles 4 and sample vessels 5 can be placed in a common storage unit of reagent and sample 3. In this example, the reagent bottles 4 are located on an inner periphery of the sample vessels 5. However, the sample vessels 5 may be located on an inner periphery of the reagent bottles 4, or the reagent bottles 4 and the sample vessels 5 may be located separately in a circumferential direction instead of a radial direction.

Between the incubator 1 and the common storage unit of reagent and sample 3, a first dispensing mechanism 8 and a second dispensing mechanism 9, each of which is capable of arcuate (rotational) movement and vertical movement and is provided with a dispensing nozzle, are installed. Pumps 10 and 11 are connected to the dispensing nozzles.

The first dispensing mechanism 8 and the second dispensing mechanism 9 are selectively used for inspections in different analysis processes. For example, when the first dispensing mechanism 8 is for biochemical use and the second dispensing mechanism 9 is for immunological use, the first dispensing mechanism 8 dispenses a sample and a reagent for biochemical inspection, and the second dispensing mechanism 9 dispenses a sample and a reagent for immunological inspection. For a sample to be subjected to both the biochemical inspection and the immunological inspection, the first dispensing mechanism 8 accesses and dispenses the sample during the biochemical inspection, and the second dispensing mechanism 9 accesses and dispenses the sample during the immunological inspection. Since it is highly necessary to prevent contamination between samples in the second dispensing mechanism 9 for immunological use, dispensing tips 18 are mounted to the dispensing nozzle at the time of dispensing. The dispensing tips 18 are stored in a dispensing tip tray 19, supplied to a dispensing tip mounting position 22 by the dispensing tip/reaction vessel transport mechanism 17, and mounted on the dispensing nozzle at the dispensing tip mounting position 22.

The dispensing nozzle moves while drawing an arc around a rotation axis, and dispenses the sample from the sample vessel to the reaction vessel. Reagent suction positions 6 and sample suction positions 7 on the common storage unit of reagent and sample 3, a first dispensing position and a second dispensing position on the incubator 1, and a cleaning tank 12 (13) for cleaning the dispensing nozzle are present on a trajectory of each dispensing nozzle. Since the dispensing tips are used in the second dispensing mechanism 9, the dispensing tip mounting position 22 and a dispensing tip disposal position 23 are also present on the trajectory in addition to those described above. The first dispensing mechanism 8 and the second dispensing mechanism 9 need to be arranged such that trajectories of respective dispensing nozzles and the mechanisms do not physically interfere with one another.

The sample and the reagent are suctioned by the dispensing nozzle during the biochemical inspection and are suctioned by the dispensing tip mounted to the dispensing nozzle during the immunological inspection, and the sample and the reagent are agitated and mixed by suction and discharge operations by the dispensing nozzle or the dispensing tip in the reaction vessel 2. In this way, by agitating the sample and the reagent by a pipetting operation using the dispensing nozzle or the dispensing tip, an agitating mechanism that agitates the sample and the reagent is not necessary. The reaction vessel 2 that accommodates a reaction liquid in which the sample and the reagent are mixed is controlled to a predetermined temperature by the incubator 1, and a reaction is promoted for a predetermined time.

A spectrophotometer 15 for biochemical inspection is arranged around the incubator 1. The spectrophotometer 15 includes a light source and a detector (which are not shown), and measures absorbance of the reaction liquid by spectrally detecting a transmitted light obtained by irradiating the reaction liquid in which the sample and the reagent are mixed with the light source.

The reaction liquid reacted for a predetermined time by the incubator 1 is measured by a detection mechanism 16 for immunological inspection. In the immunological inspection, as a method of detecting a labeling substance, there is a method using electrochemical luminescence or chemical luminescence as a principle. Structures and physical properties of a second liquid, the labeling substance, and a detection region suitable for each method are selected, and an amount of luminescence derived from a luminescence reaction of the labeling substance is measured using a photomultiplier tube as a detector.

In the biochemical inspection, the reaction vessel 2 in which measurement of absorbance is completed in the incubator 1 is disposed into a dispensing tip/reaction vessel disposal box 21 by the dispensing tip/reaction vessel transport mechanism 17. In the immunological inspection, the dispensing tip/reaction vessel transport mechanism 17 also moves the reaction vessel 2 that accommodates the reaction liquid reacted for a predetermined time by the incubator 1 to the detection mechanism 16 and moves the reaction vessel 2 in which measurement by the detection mechanism 16 is completed to the dispensing tip/reaction vessel disposal box 21.

Each mechanism of the automatic analysis device is connected to a control unit 28. The control unit 28 controls various mechanisms that executes rotation drive of the incubator, rotation operation inside the common storage unit of reagent and sample, drive of a sample nozzle, sample suction operation, sample discharge operation, and the like. In FIG. 1, for simplicity of illustration, connection between each mechanism constituting the automatic analysis device and the control unit is omitted.

FIG. 2 shows a procedure of nozzle agitation. Since agitation by the dispensing nozzle and nozzle agitation by the dispensing tip are executed in the same manner, hereinafter, both of the dispensing nozzle and the dispensing tip are collectively referred to as a nozzle. S01 shows a state in which a sample and a reagent are separately dispensed into a reaction vessel 102 by a nozzle 101, and a mixed liquid 103 of the sample and the reagent is accommodated in the reaction vessel 102. Subsequently, the nozzle is descended toward the mixed liquid 103, and a tip of the nozzle 101 is immersed in the mixed liquid 103 by about 3 mm (S02). Subsequently, the mixed liquid 103 is suctioned while the nozzle 101 is descended (hereinafter, referred to as "re-suction", S03). Subsequently, the mixed liquid 103 is discharged into the reaction vessel 102 while the nozzle 101 is ascended (hereinafter, referred to as "re-discharging", S04). The above-described dispensing operation, re-suction operation, and re-discharging operation may be executed by driving a syringe, and the re-suction operation and the re-discharging operation may be repeated a plurality of times as necessary.

Embodiment 1

FIG. 3 shows an example of drive control of nozzle agitation according to Embodiment 1. A time chart C01 shows a flow rate at which the nozzle suctions or discharges a mixed liquid in the nozzle agitation. In Embodiment 1, a flow rate during re-discharging of the mixed liquid is set to two stages including high speed discharging and low speed discharging. Specifically, re-suction of the mixed liquid is executed (time points $T_0$ to $T_1$) and then stopped (time points $T_1$ to $T_2$). Thereafter, two stages of re-discharging that include re-discharging under high speed discharging (time points $T_2$ to $T_3$) and re-discharging under low speed discharging (time points $T_;$ to $T_4$) are executed, and then stopped. In the two stages of re-discharging, a discharge flow rate per unit time is set constant. A short stop period is provided between each of the re-suction and the re-discharging and a next operation. Terms of "high speed" and "low speed" are based on a difference in relative speed between two speeds, and do not mean that the speed is higher or lower than a specific speed. The same applies to the following embodiments.

A time chart C02 shows a nozzle moving speed, and a time chart C03 shows a relationship between a height of a liquid surface of the mixed liquid in the reaction vessel and a height of the nozzle tip in association with the movement of the nozzle. In Embodiment 1, the nozzle is ascended at a high speed in a re-discharging period (time points $T_2$ to $T_3$) under the high speed discharging, and the nozzle is ascended at a low speed in a re-discharging period (time points $T_3$ to $T_4$) under the low speed discharging. At this time, an ascending speed of the nozzle in a high speed ascending period (time points $T_2$ to $T_3$) is set to be higher than an ascending speed of the liquid surface, and is determined as a speed at which the tip of the nozzle is located near the liquid surface at the end of the high speed ascending period (time point $T_3$). By setting the ascending speed of the nozzle in a low speed ascending period (time points $T_3$ to $T_4$) to be equal to the ascending speed of the liquid surface, the tip of the nozzle continues to be located near the liquid surface all the time in the re-discharging period (time points $T_3$ to $T_4$) under the low speed discharging.

The movement of the nozzle is controlled by the control unit of the automatic analysis device. The control unit detects the liquid surface by a liquid surface detection mechanism provided in the dispensing mechanism while descending the nozzle above the liquid surface before start of the re-suction (before time point $T_0$), and stops the nozzle when the nozzle is descended to a certain depth from the liquid surface. In the subsequent re-discharging, control values of the ascending speed and the time of the nozzle are given to the control unit in advance according to a displacement of the height of the liquid surface of the mixed liquid by a specified flow rate (the time chart C01), and the control unit controls the operation of the nozzle according to the control values. The same applies to the following embodiments.

FIG. 4 is a diagram schematically showing a state in which a mixed liquid is agitated. At the time of high speed discharging, a lower portion of the mixed liquid 103 is mainly agitated by a flow of a liquid generated by discharging the mixed liquid 103 from the nozzle 101 at a high speed (S11). At the time of the subsequent low speed discharging, an upper portion of the mixed liquid 103, particularly a portion near the liquid surface, is mainly agitated by a flow of a liquid generated by discharging, at a low speed, the mixed liquid 103 from the nozzle 101 that is located near the liquid surface (S12).

In this way, when the mixed liquid is discharged at a high speed, the mixed liquid moves farther in a unit time, and therefore, the flow is generated in the lower portion of the mixed liquid. On the other hand, when the mixed liquid is discharged at a low speed, a moving distance of the mixed liquid per unit time is short, and therefore, the flow is generated in the upper portion of the mixed liquid. In addition, at the time of the low speed discharging, since the tip of the nozzle is located near the liquid surface, an upper portion including the portion near the liquid surface of the mixed liquid 103 is agitated. As a result, the uniformity of the mixed liquid 103 in the reaction vessel 102 due to the nozzle agitation can be enhanced (313).

The height of the nozzle tip during the low speed discharging may be close to the height of the liquid surface, and the height of the nozzle tip may be lower than the height of the liquid surface, may be the same as the height of the liquid surface, or may be higher than the height of the liquid surface. However, the lower the height of the nozzle tip is lower than the height of the liquid surface, the more difficult it is to agitate the liquid near the liquid surface. Therefore, the height of the nozzle tip needs to be at a position higher than the height of the nozzle tip at least at the time of suction. In addition, when the height of the nozzle tip is excessively higher than the height of the liquid surface, the mixed liquid in the nozzle and the mixed liquid in the reaction vessel are interrupted and bubbles are easily entrained. Therefore, the height of the nozzle tip needs to be set to a height at which the mixed liquid is not interrupted. The same applies to the following embodiments.

Embodiment 2

FIG. 5 shows an example of drive control of nozzle agitation according to Embodiment 2. A time chart C11 shows a flow rate at which the nozzle suctions or discharges the mixed liquid in the nozzle agitation. Also, in Embodiment 2, the flow rate during re-discharging of the mixed liquid is set to two stages including high speed discharging and low speed discharging, but an order thereof is different from that in Embodiment 1. Specifically, re-suction of the mixed liquid is executed (time points $T_{10}$ to $T_{11}$) and then stopped (time points $T_{11}$ to $T_{12}$). Thereafter, two stages of re-discharging that include re-discharging under low speed discharging (time points $T_{12}$ to $T_{13}$) and re-discharging under high speed discharging (time points $T_{13}$ to $T_{14}$) are executed, and then stopped. A short stop period is provided between each of the re-suction and the re-discharging and a next operation.

A time chart C12 shows a nozzle moving speed, and a time chart C13 shows a relationship between a height of a liquid surface of the mixed liquid in the reaction vessel and a height of the nozzle tip in association with the movement of the nozzle. In Embodiment 2, the nozzle is ascended at a high speed in an initial stage (time points $T_{12}$ to $T_{15}$) of a re-discharging period (time points $T_{12}$ to $T_{13}$) under the low speed discharging, and the nozzle is ascended at a low speed in a later stage (time points $T_{13}$ to $T_{13}$) of the re-discharging period under the low speed discharging and in the re-discharging period (time points $T_{13}$ to $T_{14}$ under the high speed discharging. In this example, the nozzle tip reaches the liquid surface at the time point $T_{16}$.

An ascending speed of the nozzle in a high speed ascending period (time points $T_{12}$ to $T_{15}$) is set to be higher than an ascending speed of the liquid surface, and is determined as a speed at which the tip of the nozzle is located near the liquid surface at the end of the high speed ascending period (time point $T_{13}$). By setting the ascending speed of the nozzle in a low speed ascending period (time points $T_{13}$ to $T_{14}$) to be equal to the ascending speed of the liquid surface in the later stage (time points $T_{13}$ to $T_{13}$) of the re-discharging period under the low speed discharging, the tip of the nozzle continues to be located near the liquid surface all the time during that period.

FIG. 6 is a diagram schematically showing a state in which a mixed liquid is agitated. The nozzle tip moves to a position near the liquid surface in the initial stage of the low speed discharging, and the upper portion of the mixed liquid 103, particularly the position near the liquid surface, is mainly agitated by a flow of a liquid generated by discharging the mixed liquid 103 at a low speed from the nozzle 101 that is located near the liquid surface in the later stage of the low speed discharging (S21). Thereafter, the lower portion of the mixed liquid 103 is mainly agitated by the flow of the liquid generated by discharging the mixed liquid 103 from the nozzle 101 at a high speed (S22). In this way, by agitating each of the upper portion including the position near the liquid surface and the lower portion of the mixed liquid 103, the uniformity of the mixed liquid 103 in the reaction vessel 102 due to the nozzle agitation can be enhanced as in Embodiment 1 (S23).

In Embodiment 2, since the nozzle is ascended at a low speed in the re-discharging period (time points $T_{13}$ to $T_{14}$) under the high speed discharging, the nozzle tip is located below the liquid surface at the time point $T_{14}$, but when a difference between the height of the nozzle tip and the height of the liquid surface at this time is controlled to be equal to or less than a difference in height at the time of re-suction, a cleaning range of the nozzle does not expand. On the other hand, at the time point $T_{13}$, since the liquid is discharged at a high flow rate near the liquid surface, the liquid surface is more likely to fluctuate than in Embodiment 1, and there is a high possibility that bubbles are entrained. Therefore, in Embodiment 2, it is desirable that the height of the nozzle tip is set to be at least equal to or lower than the height of the liquid surface at the time point $T_{13}$.

Embodiment 3

FIG. 7 shows an example of drive control of nozzle agitation according to Embodiment 3. A time chart C21 shows a flow rate at which the nozzle suctions or discharges the mixed liquid in the nozzle agitation. In Embodiment 3, during re-discharging of the mixed liquid, the mixed liquid is discharged at a constant discharge flow rate per unit time (hereinafter, referred to as high speed discharging because it is assumed that this re-discharging corresponds to the high speed discharging in Embodiments 1 and 2), and then the mixed liquid is discharged while the discharge flow rate per unit time is reduced. Specifically, re-suction of the mixed liquid is executed (time points $T_{20}$ to $T_{21}$) and then stopped (time points $T_{21}$ to $T_{22}$). Thereafter, after re-discharging (time points $T_{22}$ to $T_{23}$) under the high speed discharging for a certain period of time, the re-discharging is executed during speed reduction (time points $T_{23}$ to $T_{24}$), and then stopped. A short stop period is provided between each of the re-suction and the re-discharging and a next operation.

A time chart C22 shows a nozzle moving speed, and a time chart C23 shows a relationship between a height of a liquid surface of the mixed liquid in the reaction vessel and a height of the nozzle tip in association with the movement of the nozzle. In Embodiment 3, the nozzle is ascended at a high speed in a re-discharging period (time points $T_{22}$ to $T_{23}$) under the high speed discharging, and the nozzle is ascended at a low speed in a re-discharging period (time points $T_{23}$ to $T_{24}$) during the speed reduction.

An ascending speed of the nozzle in a high speed ascending period (time points $T_{22}$ to $T_{23}$) is set to be higher than an ascending speed of the liquid surface, and is determined as a speed at which the tip of the nozzle is located near the liquid surface at the end of the high speed ascending period (time point $T_{23}$). An ascending speed of the nozzle in a low speed ascending period (time points $T_{23}$ to $T_{24}$) is determined as a speed at which the tip of the nozzle is located near the liquid surface at the end of the low speed ascending period (time point $T_{24}$). Although a slight deviation occurs between the tip of the nozzle and the liquid surface in the initial stage of discharging during speed reduction, as ascending of the liquid surface becomes slow due to reduction in flow rate, the deviation occurred in the initial stage of the discharging during speed reduction is eliminated, and the tip of the nozzle is located near the liquid surface.

FIG. 8 is a diagram schematically showing a state in which a mixed liquid is agitated. At the time of high speed discharging, a lower portion of the mixed liquid 103 is mainly agitated by a flow of a liquid generated by discharging the mixed liquid 103 from the nozzle 101 at a high speed (S31). At the time of the subsequent discharge during speed reduction, an upper portion of the mixed liquid 103, particularly a portion near the liquid surface, is mainly agitated by a flow of a liquid generated by reducing the speed and discharging the mixed liquid 103 from the nozzle 101 that is located near the liquid surface during speed reduction (S32). In this way, by agitating each of the upper portion including the position near the liquid surface and the lower portion of the mixed liquid 103, the uniformity of the mixed liquid 103 in the reaction vessel 102 due to the nozzle agitation can be enhanced as in Embodiment 1 and Embodiment 2 (S33).

In Embodiment 3, since the flow rate in the re-discharging is set to one stage, set parameters are smaller than those in Embodiment 1 and Embodiment 2, and mounting is easy. It is necessary to set the nozzle moving speed so as to minimize the deviation between the tip of the nozzle and the liquid surface generated in the discharging during speed reduction.

An effect of improving an agitating efficiency in the above-described embodiments will be described using results of fluid analysis. FIG. 9 is a diagram showing an analysis model used for computational fluid analysis. The analysis model includes a nozzle 201 and a reaction vessel 202, and as an initial state, the nozzle 201 is provided with a sample 203 and a reagent 204. By providing a flow speed as a boundary condition to an upper surface of the nozzle 201, a state in which a solution is discharged from the nozzle 201 or the solution is suctioned into the nozzle 201 is analyzed. In addition, by providing a movement of the nozzle 201 to an analysis condition, a state in which the nozzle 201 is descended or ascended is analyzed.

FIGS. 10A and 10B show analysis results. The analysis is executed on conditions of the flow rate and the nozzle moving speed according to Embodiment 1 (see FIG. 3) and a comparative example. In the comparative example, a flow rate and a nozzle moving speed at the time of re-discharging are constant. Therefore, in the comparative example, a constant distance is maintained between the liquid surface and the nozzle tip in a re-discharging period. FIGS. 10A and 10B plot a relationship between a time and a coefficient of variation (CV) value of a sample concentration in the reaction vessel. A graph 301 shows an analysis result of the comparative example, and a graph 302 shows an analysis result of Embodiment 1. The CV value is an index indicating a variation in sample concentration, and is calculated by a ratio (standard deviation/average value) between an average value and a standard deviation of the sample concentration calculated in each analysis cell in the reaction vessel 202.

FIG. 10B is an enlarged view of a period of time 1 s to 1.5 s. At the end of the re-discharging (1.5 s), the CV value of Embodiment 1 (302) is smaller than that of the comparative example (301), that is, it can be seen that the liquid is more uniformly agitated in Embodiment 1 than in the comparative example.

The embodiments of the invention have been described above. The invention is not limited to the embodiments described above, and includes various modifications. For example, as the dispensing mechanism that executes the nozzle agitation, a dispensing mechanism that dispenses both a sample and a reagent is exemplified, but the nozzle agitation can be executed by a dispensing mechanism that dispenses the sample or the reagent. The embodiments have been described in detail for easy understanding of the invention, and the invention is not necessarily limited to those including all of the configurations described above. In addition, a part of a configuration of a certain embodiment may be replaced with a configuration of another embodiment, and a configuration of a certain embodiment may also be added with a configuration of another embodiment. A part of a configuration of each embodiment may be added, deleted, or replaced with another configuration.

REFERENCE SIGN LIST

1: incubator
2: reaction vessel
3: common storage unit of reagent and sample
4: reagent bottle
5: sample vessel
6: reagent suction position
7: sample suction position
8: first dispensing mechanism
9: second dispensing mechanism
10, 11: pump
12, 13: cleaning tank
15: spectrophotometer
16: detection mechanism
17: dispensing tip/reaction vessel transport mechanism
18: dispensing tip
19: dispensing tip tray
20: reaction vessel tray
21: dispensing tip/reaction vessel disposal box
22: dispensing tip mounting position
23: dispensing tip disposal position
28: control unit
101: nozzle
102: reaction vessel
103: mixed liquid
201: nozzle (model)
202: reaction vessel (model)
203: sample (model)
204: reagent (model)
301, 302: graph

The invention claimed is:

1. An automatic device for preparing a sample for analysis, the automatic device comprising:
an incubator in which a reaction vessel is arranged;
a dispensing mechanism that includes a nozzle movable upward or downward and a liquid surface detection mechanism for sensing a level of liquid in the reaction vessel, the dispensing mechanism dispenses the sample and a reagent into the reaction vessel; and
a control unit that controls the dispensing mechanism to agitate a mixed liquid of the sample and the reagent in the reaction vessel, wherein the mixed liquid is agitated by suctioning the mixed liquid in the reaction vessel and performing a plurality of re-discharging operations of the mixed liquid into the reaction vessel,
wherein performing the plurality of re-discharging operations include:
performing a first re-discharge of the mixed liquid into the reaction vessel at a first discharge flow rate during a first period,
determining a first speed for moving the nozzle upward during the first period such that a top of the nozzle is located near a liquid surface of the mixed liquid at an end of the first period and the first speed is higher than a speed at which the liquid surface of the mixed liquid rises due to the first re-discharging of the mixed liquid,
moving the nozzle upward during the first period at the first speed,
performing a second re-discharge the mixed liquid into the reaction vessel at a second discharge flow rate when a tip of the nozzle is located at or above the liquid surface of the mixed liquid, wherein is the mixed liquid is re-discharged into the reaction vessel at the discharge flow second rate for a second period that is subsequent to the first period, and
moving the nozzle upward at a second speed that is lower than the first speed during the second period, wherein the nozzle is moved upward at the second speed,
wherein at an end of the second period the tip of the nozzle is located at or above the liquid surface of the mixed liquid.

2. The automatic device according to claim 1, wherein the second discharge flow rate is smaller than the first discharge flow rate.

3. The automatic device according to claim 2, wherein the second speed is equal to the speed at which the liquid surface of the mixed liquid rises during the second period.

4. The automatic device according to claim 1, wherein the first discharge flow rate and the second discharge flow rate are equal.

5. The automatic device according to claim 4, wherein the second speed is equal to the speed at which the liquid surface of the mixed liquid rises during the second period.

6. The automatic device according to claim 4, wherein the control unit increases the speed at which the liquid surface of the mixed liquid in the reaction vessel rises due to a third re-discharging of the mixed liquid from the nozzle, during a third period following the second period.

7. The automatic device according to claim 6, wherein the control unit is further configured to:
move the nozzle during the third period at a third speed that is slower than the speed at which the liquid surface of the mixed liquid rises during the third period.

8. The automatic device according to claim 7, wherein at the end of the third period, a position of the tip of the nozzle is located above the position of the tip of the nozzle when the mixed liquid is suctioned by the nozzle.

9. The automatic device according to claim 1, wherein wherein a rate of the second re-discharge gradually decreases from the first discharge flow rate to the second discharge flow rate.

10. The automatic device according to claim 9, wherein the second speed is determined such that the tip of the nozzle is located at or above the liquid surface of the mixed liquid at the end of the second period.

\* \* \* \* \*